United States Patent
Konada et al.

(10) Patent No.: US 12,330,465 B2
(45) Date of Patent: Jun. 17, 2025

(54) VEHICULAR STATE ESTIMATION APPARATUS, AND METHOD OF CONTROLLING OPERATION OF ACTIVE SUSPENSION APPARATUS

(71) Applicant: HONDA MOTOR CO., LTD., Tokyo (JP)

(72) Inventors: Kazuya Konada, Saitama (JP); Ryosuke Yamazaki, Saitama (JP); Takashi Yanagi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 18/472,232

(22) Filed: Sep. 22, 2023

(65) Prior Publication Data

US 2024/0109386 A1    Apr. 4, 2024

(30) Foreign Application Priority Data

Sep. 30, 2022    (JP) ................................ 2022-157906

(51) Int. Cl.
*B60G 17/019* (2006.01)
*B60G 17/016* (2006.01)
*G01M 17/04* (2006.01)

(52) U.S. Cl.
CPC .......... *B60G 17/019* (2013.01); *G01M 17/04* (2013.01); *B60G 2400/52* (2013.01); *B60G 2400/82* (2013.01); *B60G 2400/90* (2013.01)

(58) Field of Classification Search
CPC . B60G 17/0165; B60G 17/019; B60G 17/018
See application file for complete search history.

(56) References Cited

U.S. PATENT DOCUMENTS

| 9,702,349 | B2 * | 7/2017 | Anderson | B60G 17/052 |
| 10,293,653 | B2 * | 5/2019 | Hrovat | B60G 17/0195 |
| 11,733,396 | B2 * | 8/2023 | Furuta | G01S 19/45 |
| | | | | 701/495 |
| 2008/0119984 | A1 * | 5/2008 | Hrovat | B62D 9/00 |
| | | | | 701/41 |
| 2013/0103259 | A1 * | 4/2013 | Eng | B60G 17/0165 |
| | | | | 701/37 |

(Continued)

FOREIGN PATENT DOCUMENTS

JP    2010195323 A    9/2010

*Primary Examiner* — Long T Tran
(74) *Attorney, Agent, or Firm* — CKC & Partners Co., LLC

(57) ABSTRACT

The vehicular state estimation apparatus includes: a physical quantity detector configured to detect a physical quantity indicating behavior by the vehicle; a vehicle behavior estimator configured to estimate current behavior by the vehicle; a distance sensor that is configured to detect a value pertaining to a distance between the vehicle body member and a measurement point on a road surface in front of the vehicle and corresponding to at least a central section of a road surface contact section on a wheel; a distance calculator configured to calculate a road surface distance; a spring constant calculator configured to calculate at least one of spring constants, in a vehicle stopped state; and a suspension controller configured to control operation of the active suspension apparatus based on the spring constants, the road surface distance, and vehicle behavior information.

8 Claims, 5 Drawing Sheets

(56) References Cited

U.S. PATENT DOCUMENTS

| | | | |
|---|---|---|---|
| 2015/0006030 A1* | 1/2015 | Bennett | B60G 17/0195 |
| | | | 701/37 |
| 2015/0204412 A1* | 7/2015 | Yamashita | F16F 9/18 |
| | | | 188/271 |
| 2017/0087951 A1* | 3/2017 | Hrovat | B60G 17/018 |
| 2017/0100980 A1* | 4/2017 | Tsuda | B60G 17/0165 |
| 2017/0136842 A1* | 5/2017 | Anderson | B60N 2/14 |
| 2021/0107385 A1* | 4/2021 | Kuretake | B60N 2/502 |
| 2022/0105773 A1* | 4/2022 | Kim | B60G 17/06 |

\* cited by examiner

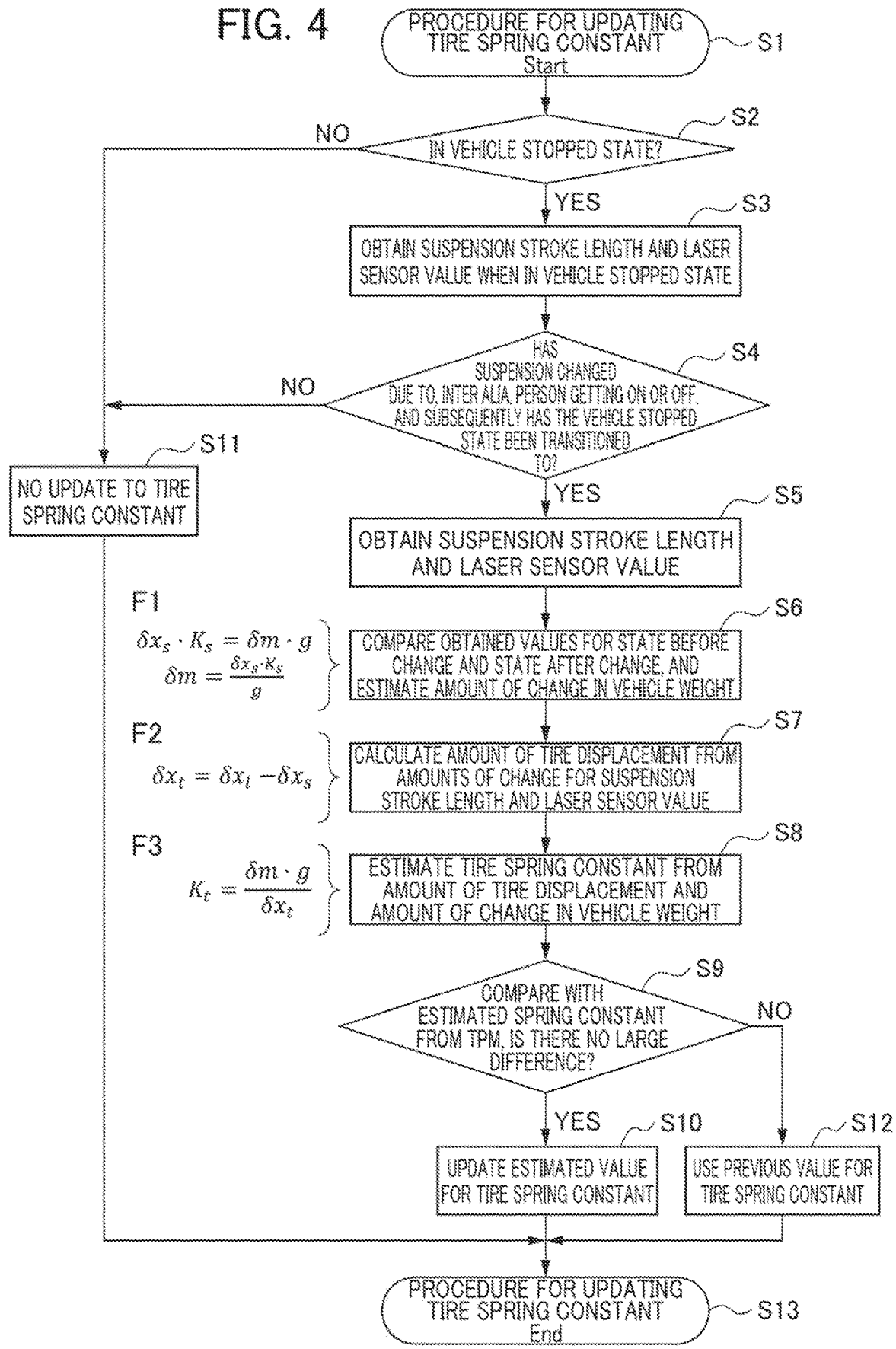

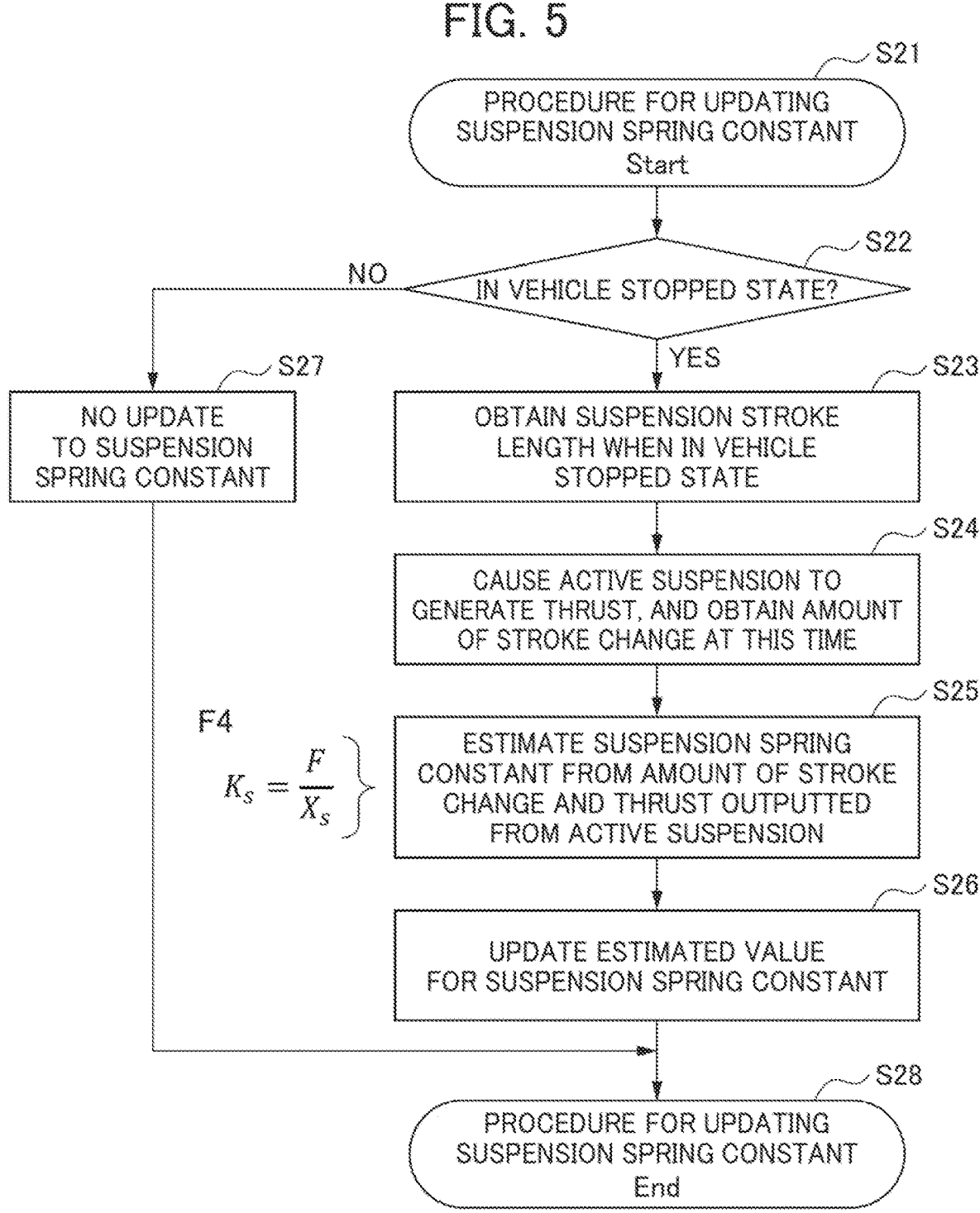

$$F_R(s) = -\frac{(C_s s + K_s)(C_t s + K_t)}{M_t s^2 + C_t s + K_t} x_{rR}$$

VEHICULAR STATE ESTIMATION APPARATUS, AND METHOD OF CONTROLLING OPERATION OF ACTIVE SUSPENSION APPARATUS

CROSS REFERENCE TO RELATED APPLICATIONS

This application claims the benefit of priority to Japanese Patent Application No. 2022-157906 filed on Sep. 30, 2022. The entire contents of this application are hereby incorporated herein by reference.

BACKGROUND OF THE INVENTION

Field of the Invention

The present invention pertains to a vehicular state estimation apparatus and a method of controlling operation of an active suspension apparatus.

Related Art

In recent years, there have been greater efforts to provide access to a sustainable transport system that considers people in vulnerable positions, such as elderly persons, disabled persons, or children, from among traffic participants. Towards realizing this, focus is being given to research and development for further improving traffic safety or convenience through development pertaining to the stability of behavior by vehicles.

In order to improve the stability of behavior by vehicles, a vehicle provided with an active suspension has been proposed. For example, a vehicle described in Patent Document 1 is provided with a vehicle body behavior estimator. Future front wheel suspension speed and displacement as well as future rear wheel suspension speed and displacement are inputted to this vehicle body behavior estimator. Based on these items of input information, damping coefficients for dampers installed for respective wheels, and spring constants of suspension installed for respective wheels are calculated. Estimated vehicle body behavior is outputted to a suspension controller. As a result, it becomes possible to realize a semi-active suspension or a stabilizer that is capable of changing rigidity.

Patent Document 1: Japanese Unexamined Patent Application, Publication No. 2010-195323

SUMMARY OF THE INVENTION

Incidentally, for the stability of behavior by a vehicle, it is necessary to more accurately grasp vehicle specifications such as spring constants and reflect these vehicle specifications in control, but there is a problem of differences from design-based theoretical values due to effects such as wear, deterioration, error or variation in components or the assembly of the vehicle. In particularly, low accuracy in spring constant calculations is a problem for more accurate estimation of behavior by a vehicle.

In order to resolve the abovementioned problem, one object of the present application is to provide a vehicular state estimation apparatus having improved accuracy in the calculation of a spring constant. An object is consequently to contribute to the development of a sustainable transport system.

(1) In order to solve the abovementioned problem, a vehicular state estimation apparatus according to the present invention is a vehicular state estimation apparatus for use in a vehicle provided with an active suspension apparatus and a suspension control apparatus, the vehicular state estimation apparatus comprising: a physical quantity detector configured to detect a physical quantity indicating behavior by the vehicle; a vehicle behavior estimator configured to, based on the physical quantity detected by the physical quantity detector, estimate current behavior by the vehicle; a distance sensor that is provided on a vehicle body member included in the vehicle and is configured to detect a value pertaining to a distance between the vehicle body member and a measurement point on a road surface in front of the vehicle and corresponding to at least a central section belonging to a road surface contact section on a wheel; a distance calculator configured to, based on the value detected by the distance sensor, calculate a road surface distance that is a distance from the vehicle body member to the measurement point; a spring constant calculator configured to calculate at least one of spring constants of the active suspension apparatus, in a vehicle stopped state; and a suspension controller configured to control operation of the active suspension apparatus based on the spring constants, the road surface distance, and vehicle behavior information that is information indicating the current behavior by the vehicle estimated by the vehicle behavior estimator.

By virtue of such a vehicular state estimation apparatus, it is possible to provide a vehicular state estimation apparatus having improved accuracy in the calculation of a spring constant. This is because it is possible to calculate the spring constant with good accuracy in comparison to a case of calculating the spring constant when traveling.

(2) In the vehicular state estimation apparatus according to the present invention, the distance calculator calculates, as the road surface distance, a distance from the vehicle body member to the measurement point in front of a front wheel belonging to the vehicle, and the spring constant calculator calculates the spring constant of the active suspension apparatus corresponding to the front wheel.

By virtue of such a vehicular state estimation apparatus, a spring constant of a front wheel is calculated based on a road surface distance that is in front of a front wheel and is getting nearer. Accordingly, it is possible to calculate the spring constant with good accuracy. This is because measurement accuracy is improved over calculating a spring constant of a rear wheel by the road surface distance in front of a front wheel, and consequently it is less likely for the accuracy of the calculated spring constant to decrease.

(3) In the vehicular state estimation apparatus according to the present invention, when the vehicle is not in the vehicle stopped state, the suspension controller controls operation of the active suspension apparatus by employing, as the spring constant, a fixed value or a value used at a time of previous control.

By virtue of such a vehicular state estimation apparatus, it is possible to suppress the application of a spring constant having an abnormal value. This is because only a spring constant that was calculated in a stopped state is employed.

(4) In the vehicular state estimation apparatus according to the present invention, the suspension controller uses the spring constants in at least one calculation from among a correction for preview control, adjusting a constant in skyhook control, or adjusting a constant in damping control.

By virtue of such a vehicular state estimation apparatus, it is possible to improve the accuracy of various control in a suspension control means, even when there are individual differences or differences in condition. This is because a plurality of types of modes for suspension control are prepared.

(5) In the vehicular state estimation apparatus according to the present invention, the suspension controller exchanges the calculated spring constant of a member with a spring constant of a corresponding member in an equation for calculating the correction for preview control.

By virtue of such a vehicular state estimation apparatus, it is possible to improve the accuracy of various control in a suspension control means, even when there are individual differences or differences in condition. This is because it is possible to individually optimize the plurality of types of suspension control modes that are prepared.

(6) In the vehicular state estimation apparatus according to the present invention, the calculated spring constant of the member is a tire spring constant, and the suspension controller adjusts a damper constant in an equation for damping control adjustment such that the greater the tire spring constant, the smaller the damper constant in a stroke speed×the damper constant.

By virtue of such a vehicular state estimation apparatus, it is possible to improve the accuracy of various control in a suspension control means, even when there are individual differences or differences in condition. This is because it is possible to individually optimize the plurality of types of suspension control modes that are prepared.

(7) The vehicular state estimation apparatus according to the present invention further includes: a tire pressure detector, the calculated spring constant of a member being a tire spring constant, a tire spring constant prediction value estimated based on a tire pressure detected by the tire pressure detector being compared with the calculated tire spring constant, and in a case where a difference between the tire spring constant prediction value and the calculated tire spring constant is greater than or equal to a certain level, the operation of the active suspension apparatus is controlled by employing, as the spring constant, a fixed value or a value used at a time of previous control.

By virtue of such a vehicular state estimation apparatus, it is possible to improve the reliability of a calculated spring constant. A calculated spring constant is compared with a spring constant obtained by a different method, whereby it is possible to suppress the application of a spring constant having an abnormal value.

(8) In order to solve the abovementioned problem, a method of controlling operation of an active suspension apparatus according to the present invention is a method of controlling operation of the active suspension apparatus in a vehicle provided with the active suspension apparatus and a suspension control apparatus, the method comprising: detecting a physical quantity indicating behavior by the vehicle; estimating current behavior by the vehicle based on the physical quantity detected in the detecting a physical quantity; detecting a value pertaining to a distance between a vehicle body member included in the vehicle and a measurement point on a road surface in front of the vehicle and corresponding to at least a central section belonging to a road surface contact section on a wheel; calculating a road surface distance that is a distance from the vehicle body member to the measurement point based on the value detected in the detecting a value pertaining to a distance; calculating at least one of spring constants of the active suspension apparatus, in a vehicle stopped state; and controlling operation of the active suspension apparatus based on the spring constants, the road surface distance, and vehicle behavior information that is information indicating the current behavior by the vehicle estimated in the detecting a physical quantity indicating behavior by the vehicle.

By virtue of such a method of controlling operation of an active suspension apparatus, it is possible to provide a method of controlling operation of an active suspension apparatus having improved accuracy for the calculation of spring constants. This is because it is possible to calculate the spring constant with good accuracy in comparison to a case of calculating the spring constant when traveling.

Note that (1) through (8) described above can be arbitrarily combined, if necessary.

By virtue of the present invention, it is possible to provide a vehicular state estimation apparatus having improved accuracy in the calculation of a spring constant.

BRIEF DESCRIPTION OF THE DRAWINGS

FIG. 4 is a view that illustrates a flow of processing for a time of estimating a tire spring constant;

FIG. 5 is a view that illustrates a flow of processing for a time of estimating a suspension spring constant.

DETAILED DESCRIPTION OF THE INVENTION (Suspension System)

Figure 1:
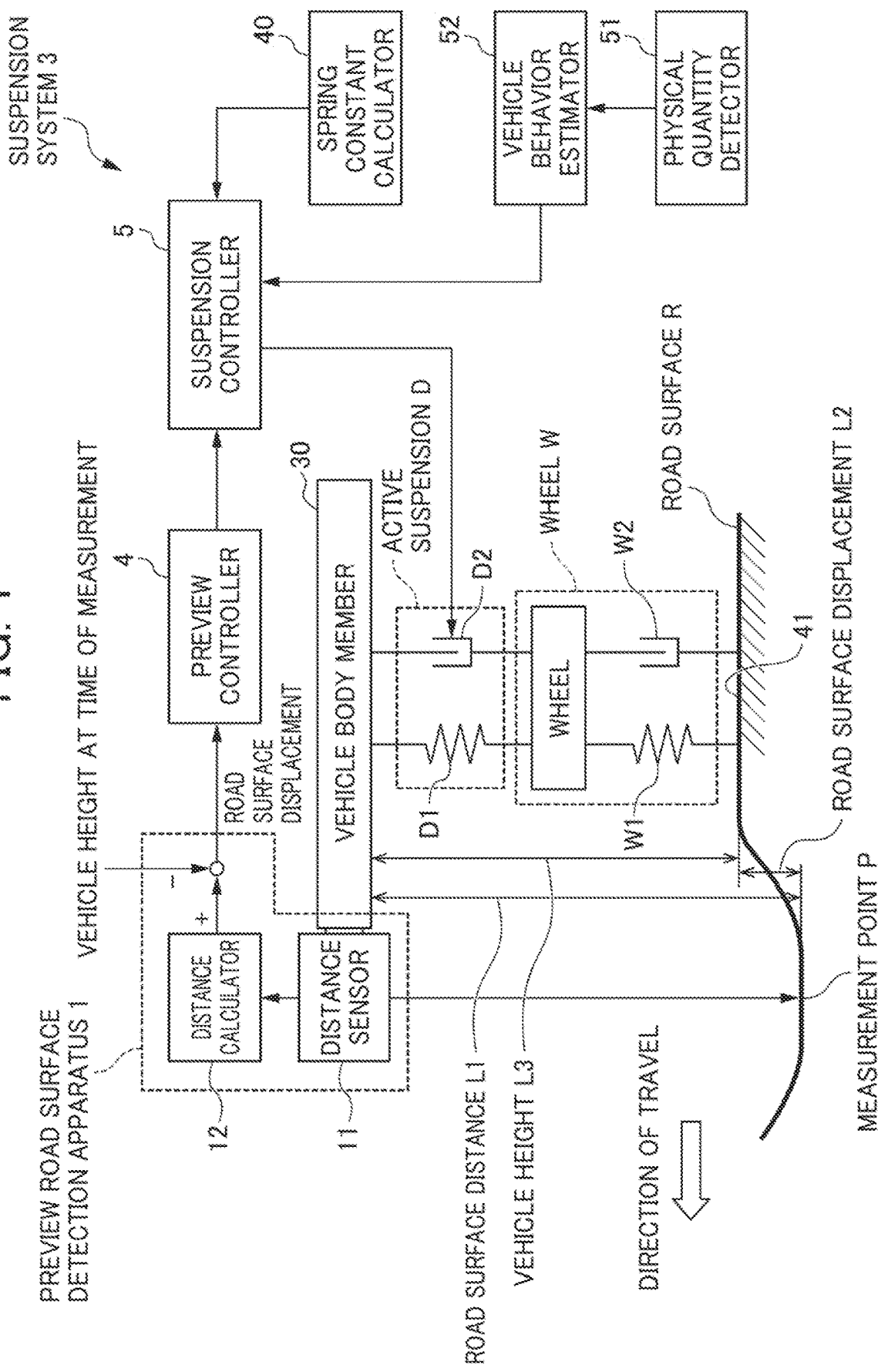
FIG. 1 is a block view that illustrates an outline of a suspension system for a vehicle.

Description is given below regarding embodiments of the present invention with reference to the drawings. FIG. 1 is a view that illustrates an outline of a vehicular suspension system 3 in which a preview road surface detection apparatus 1 according to the present embodiment is employed.

The suspension system 3 includes the preview road surface detection apparatus 1, a preview controller 4, a suspension controller 5, a vehicle body member 30, an active suspension D, and a wheel W. The preview road surface detection apparatus 1 is provided with a distance calculator 12 and a distance sensor 11.

In the suspension system 3, the suspension controller 5 controls the active suspension D such that the orientation of the vehicle body member 30 is stable. For example, this control is performed based on, inter alia, skyhook theory.

(Road Surface Displacement)

In control of the active suspension D, the preview road surface detection apparatus 1 firstly obtains a road surface displacement L2 for in front of the vehicle. The road surface displacement L2 is the distance between a road surface R that the wheel W is in contact with at the current time and a measurement point P, in a direction orthogonal to the road surface R. Note that the road surface R means the ground that the wheel W is in contact with. In addition, the measurement point P means a point on the ground for the distance sensor 11 to measure distance. The road surface displacement L2 may be referred to as forecast information.
(Preview Controller)

Next, the preview controller 4 obtains the road surface displacement L2 from the preview road surface detection apparatus 1. Based on a value for the road surface displacement L2, the preview controller 4 controls operation of the active suspension D to thereby reduce body vibration in accordance with a road surface input. As a result, the suspension system 3 addresses improving riding comfort for the vehicle.
(Vehicle Configuration)

Figure 2:
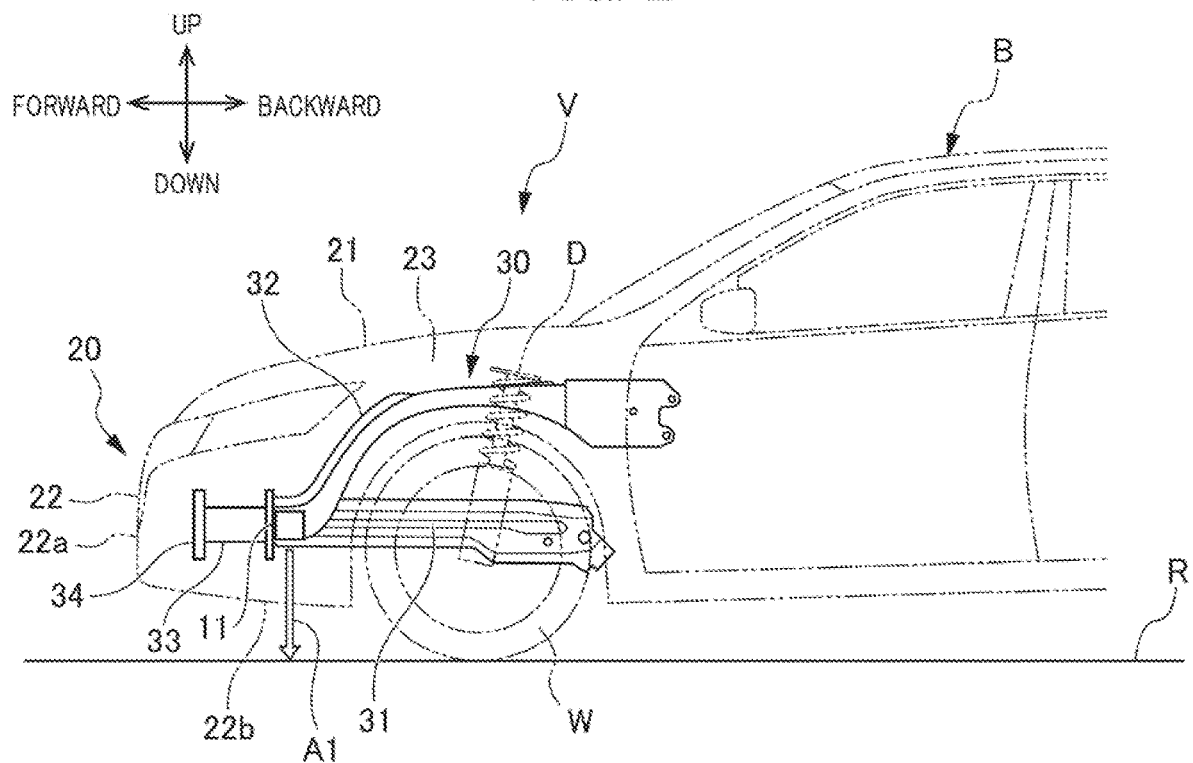
FIG. 2 is a side surface view of the vehicle, indicating a structure for attaching a distance sensor.

Referring also to FIG. 2, more specific description is given regarding the suspension system 3. FIG. 2 is a side surface view of the vehicle V, indicating a mechanism for attaching the distance sensor 11. The vehicle V is provided with a vehicle body B and wheels W. The vehicle body member 30 is included in members configuring the vehicle body B. The wheels W are provided below the vehicle body member 30. FIG. 2 illustrates a front wheel from among the wheels W. Front wheels include a left wheel and a right wheel. FIG. 2 illustrates a left wheel from among left and right wheels.
(Vibration Model)

The active suspension D and tire portions from among the wheels W absorb unevenness in the road surface R. The suspension controller 5 illustrated in FIG. 2 controls, as a vibration model, the tire portions belonging to the wheels W. A spring W1 and a damper W2 are disposed in parallel in this vibration model.
(Active Suspension)

The active suspension D can use a suspension spring D1 and a hydraulic actuator to control a damping force. Alternatively, the active suspension D can have a configuration in which the suspension spring D1 and a variable damper D2 are disposed in parallel. For the variable damper D2, damping force and thrust thereof are controlled by an electromagnetic force. The active suspension D is provided between the vehicle body member 30 and the wheel W.
(Suspension Controller)

The suspension controller 5 performs control by employing the variable damper D2 as a control target.
(Preview Road Surface Detection Apparatus)

The preview road surface detection apparatus 1 is installed on the vehicle body member 30. The preview road surface detection apparatus 1 is provided with the distance sensor 11 and the distance calculator 12.
(Distance Sensor)

The distance sensor 11 measures the distance between the vehicle body member 30 and the measurement point P on the road surface R. Let a road surface distance L1 be the distance between the vehicle body member 30 and the measurement point P on the road surface R. This measurement is performed using, inter alia, an ultrasonic wave, laser light, or a millimeter-wave radar.
(Distance Calculator)

Based on a measurement value from the distance sensor 11, the distance calculator 12 calculates the road surface displacement L2 for in front of the wheel W. Specifically, the preview road surface detection apparatus 1 calculates the road surface displacement L2 for in front of the wheel W by subtracting a vehicle height L3 at the time of measurement from the road surface distance L1 calculated by the distance calculator 12. The vehicle height L3 is the distance between the vehicle body member 30 and the road surface R, at a road surface contact section 41.

In other words, the road surface distance L1−the vehicle height L3=the road surface displacement L2. Note that, when calculating the road surface displacement L2, the vehicle height L3 can also be obtained by referring to a value that the suspension controller 5 calculates as a control variable.
(Amount of Time Required to Arrive)

The preview controller 4 obtains a required amount of time for the wheel W to travel to the measurement point P having the road surface displacement L2, from the vehicle speed when the road surface displacement L2 is measured and the distance in the direction of travel for the vehicle V from a tire ground contact point to the measurement point P having the road surface displacement L2. The required amount of time is referred to as an amount of time required to arrive. Note that the distance in the direction of travel of the vehicle V from the tire ground contact point to the measurement point P having the road surface displacement L2 can also be obtained by referring to information pertaining to an attachment position of the distance sensor 11.
(Forecast Information)

The preview road surface detection apparatus 1 and the preview controller 4 can cyclically perform the previously-described processing pertaining to obtaining the road surface displacement L2. As a result, it is possible to obtain forecast information for the road surface displacement L2. The forecast information pertains to a state of a road surface that is in front of the wheel W and is traveled over after a predetermined amount of time, as described above. The road surface condition includes, inter alia, the road surface displacement L2 and a state of unevenness regarding the road surface R.

The suspension controller 5 controls the active suspension D, based on the forecast information for the road surface displacement L2. Accordingly, the suspension controller 5 can improve riding comfort for the vehicle V.
(Preview Road Surface Detection Apparatus Attachment)

The preview road surface detection apparatus 1 according to the present embodiment includes the distance sensor 11 and the distance calculator 12, as described above. From these, the distance sensor 11 is installed on the vehicle body member 30. In contrast, the distance calculator 12 implemented by an electronic control unit (ECU) in the vehicle V.
(Distance Sensor Attachment)

Attachment of the distance sensor 11 is described in detail with reference to FIG. 2. Note that a below-described structure for attaching the distance sensor 11 and other structures in the vehicle V that are illustrated in FIG. 2 are simplified for the convenience of description. Attachment of the distance sensor 11 is not limited to that described below.
(Direction Definitions)

Note that a direction of travel for the vehicle V is described as a "forward" direction, a reverse direction is referred to as a "backward" direction, a vertically-upward direction is referred to as an "up" direction, a vertically-downward direction is referred to as a "down" direction, and a vehicle width direction is described as a "left" direction and a "right" direction. A structure for attaching vehicular sensors such as the distance sensor 11 has left-right symmetry, in principle. Accordingly, one side (the left side) from among the left and right is mainly described in the following description, and description of the other side (the right side) is omitted, as appropriate.

FIG. 2 is a side surface view of the vehicle V, illustrating a structure for attaching the distance sensor 11. Note that, in FIG. 2, the exterior of the vehicle V is indicated by double-dotted lines.

(Vehicle Body)

The vehicle V includes the vehicle body B as a main component. The vehicle body B includes, inter alia, an exterior member 20 and the distance sensor 11, in addition to the vehicle body member 30. The distance sensor 11 is secured to the vehicle body member 30.

In addition, the exterior member 20 forms outward sites on the vehicle V. The exterior member 20 forms the outer surface of the vehicle V. In contrast, the distance sensor 11 is an apparatus that detects a road surface state.

(Vehicle)

In a case where the vehicle V is an automobile provided with the vehicle body member 30, the exterior member 20, and the distance sensor 11 in this manner, the format and type thereof are not particularly limited. For example, the vehicle V can be, inter alia, a passenger car, a bus, a truck, or a work vehicle.

Description is given below in more detail regarding each member.

(Vehicle Body Member)

The vehicle body member 30 has a function for supporting the exterior member 20. In addition, the vehicle body member 30 is configured by being provided with, inter alia, a front side frame 31, an upper member 32, a bumper beam extension 33, and a bumper beam 34. Note that the front side frame 31, the upper member 32, and the bumper beam 34 may be referred to as frame members.

(Exterior Members)

The exterior member 20 is provided with an engine hood 21, a front bumper 22, and a front fender 23. Note that the front bumper 22 may be simply referred to as a bumper.

The engine hood 21 is a panel member that covers the top surface that is in front of the windshield. The front bumper 22 is positioned on the front surface side of the vehicle V, and is configured by a panel member made of a synthetic resin, for example. In addition, the front bumper 22 has a front surface section 22a in which, inter alia, an air intake is provided, and a bottom surface section 22b that extends backward from the lower end of the front surface section 22a. The front fender 23 is a panel member that covers the periphery of the wheel W.

(Distance Sensor Attachment)

The distance sensor 11 detects the state of the road surface R in front of the vehicle V. The distance sensor 11 is secured to the upper member 32. As described above, the upper member 32 is included in the vehicle body member 30. The upper member 32 is disposed in front of the wheel W.

In detail, the distance sensor 11 is attached to a side surface on the outside of the upper member 32 in the vehicle width direction. In addition, the distance sensor 11 is positioned on a front end section of the upper member 32 in a forward-backward direction.

(Distance Sensor Configuration)

As indicated by an arrow A1 in FIG. 2, the distance sensor 11 according to the present embodiment is configured to detect the road surface distance L1 for the road surface R directly in front of the wheel W. The road surface distance L1 is the distance between the vehicle body member 30 and the measurement point P on the road surface R. In addition, the distance sensor 11 can be selected, as appropriate, from sensors that use various methods, such as a radar method, a camera method, or a laser method. In addition, there is no need for the distance sensor 11 to be configured by a single type of sensor. The distance sensor 11 can be configured by combining sensors using a plurality of methods, such as the camera method and the laser method, for example.

(Sensor Element)

Figure 3:
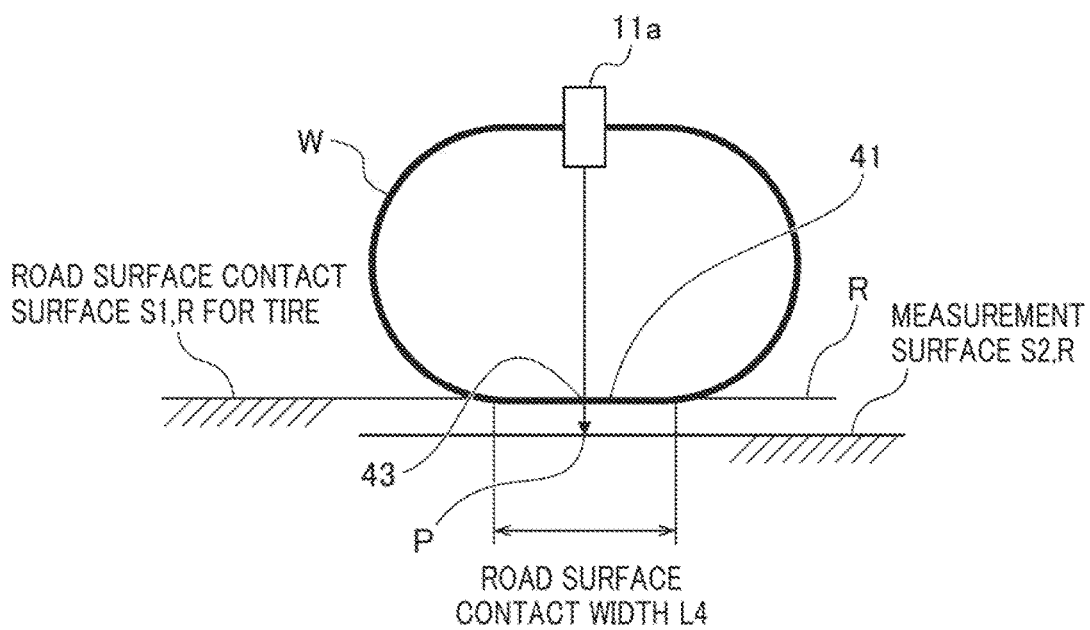
FIG. 3 is a view in which the vehicle is viewed from in front of a wheel, indicating a configuration of the distance sensor.

Next, with reference to FIG. 3, description is given regarding distance detection using the distance sensor 11. FIG. 3 illustrates a state of the distance sensor 11 when a wheel W is seen from in front of the vehicle. The distance sensor 11 according to the present embodiment is provided with a sensor element 11a. The sensor element is a component that detects distance. The distance sensor 11 is provided with at least one sensor element. A method by which each sensor element detects distance is not particularly limited. As a detection method, it is possible to use various methods, such as a method based on the principle of triangulation, a method for converting the intensity of reflected light resulting from emitted infrared light to a distance, or a method for converting laser light time of flight to a distance, for example.

(Detection by Sensor Element)

Description is given regarding distance detection using the sensor element 11a. As illustrated in FIG. 3, the wheel W is in contact with a tire road surface contact surface S1 belonging to the road surface R. As illustrated in FIG. 1, the distance sensor 11—more specifically the distance sensor element 11a—detects the distance between the vehicle body member 30 and the measurement point P at a measurement point (illustrated as the arrow tip position in FIG. 3 and the point P in FIG. 1) on a measurement surface S2 in front of the vehicle V and corresponding to a central section 43 in a road surface contact width L4 of the wheel W.

(Calculation of Road Surface Distance)

The distance calculator 12 (illustrated in FIG. 1) in the preview road surface detection apparatus 1 detects the road surface distance based on a value detected by the distance sensor element 11a.

The active suspension D in the vehicle V is controlled based on the state of the road surface R detected using the distance sensor 11. Note that the state of the road surface R may be simply referred to as the road surface state.

(Other Configurations)

FIG. 3 illustrates a configuration in which one distance sensor 11 is provided with one distance sensor element 11a. However, the number of distance sensor elements provided in one distance sensor 11 is not limited to one. Two or more distance sensor elements may be provided in one distance sensor 11. For example, three distance sensor elements may be provided in a distance sensor 11. In a case where a plurality of distance sensor elements are provided, a road surface distance can be calculated based on an average of values detected by the three distance sensor elements, for example. By using a plurality of distance sensor elements, it is possible to improve the accuracy of detecting road surface displacement.

(Outline of Vehicular State Estimation Apparatus)

The suspension system 3 according to the present embodiment also functions as a vehicular state estimation apparatus. In other words, the suspension system 3 at least includes a vehicular state estimation apparatus in a portion thereof. The vehicular state apparatus calculates a spring constant, and controls operation of an active suspension apparatus based on the calculated spring constant. For example, the active suspension D corresponds to the active suspension apparatus.

(Vehicular State Estimation Apparatus Configuration)

The vehicular state estimation apparatus is a portion of the suspension system 3 as described above. The vehicular state estimation apparatus includes a spring constant calculator 40, a physical quantity detector 51, and a vehicle behavior estimator 52. The spring constant calculator 40 is connected to the suspension controller 5 in the suspension system 3. Similarly, the vehicle behavior estimator 52 is also connected to the suspension controller 5. In addition, the physical quantity detector 51 is connected to the vehicle behavior estimator 52. By these components cooperating, the vehicular state estimation apparatus corresponds to a portion in the suspension system 3 for calculating a spring constant and controlling suspension based on the calculated spring constant.

(Spring Constant Calculator)

The spring constant calculator 40 calculates at least one of spring constants of the active suspension apparatus. The at least one spring constants of the active suspension apparatus refers to, inter alia, a spring constant of suspension and a spring constant of a tire, for example. Note that the spring constant of the suspension can be set to a spring constant of a combination of bushes and springs in the suspension. In addition, it is possible to approximate the contribution by bushes to zero in the spring constant of the suspension. In a single-wheel model of the active suspension D, which is electric suspension or the like, a suspension spring is dominant in characteristics of the active suspension D. Accordingly, even if bushes are not considered, a large difference in the behavior of the suspension does not arise. Note that a spring constant is synonymous with a spring coefficient.

(Vehicle Stopped State)

The spring constant calculator 40 calculates a spring constant in a vehicle stopped state. The vehicle stopped state means at least one time from among when there is no vertical displacement of the active suspension apparatus, when the vehicle V is started up, or when vehicle speed is 0. Note that when there is no vertical displacement of the active suspension apparatus is synonymous with when there is no displacement of the suspension.

Note that a spring constant calculated by the spring constant calculator 40 is not limited to the examples described above. For example, it is possible to target spring constants of, inter alia, a stabilizer and a damper that are directly or indirectly connected to the wheel W.

(Physical Quantity Detector)

The physical quantity detector 51 detects a physical quantity pertaining to the vehicle V. A physical quantity includes a quantity that indicates behavior by the vehicle V, for example. Behavior by the vehicle V can include, inter alia, speed, acceleration, direction of travel, and inclination of the vehicle V, for example. In addition, the physical quantity detector 51 includes a tire pressure detector. The tire pressure detector detects the pressure of a tire, in the physical quantity detector 51. Note that the tire pressure detector may also be represented as a tire pressure monitoring system (TPM).

The physical quantity detector 51 is connected to the vehicle behavior estimator 52. A physical quantity detected by the physical quantity detector 51 is inputted to the vehicle behavior estimator 52.

(Vehicle Behavior Estimator)

The vehicle behavior estimator 52 estimates current behavior by the vehicle V, based on the physical quantity detected by the physical quantity detector 51. The vehicle behavior estimator 52 is also connected to the suspension controller 5. Information that indicates the current behavior by the vehicle V and is estimated by the vehicle behavior estimator 52 is referred to as vehicle behavior information. The vehicle behavior information is inputted to the suspension controller 5.

(Suspension Controller)

In the present embodiment, the suspension controller 5 functions as a suspension controller. The suspension controller 5 controls operation of the active suspension D based on the spring constant calculated by the spring constant calculator 40, the road surface distance, and the vehicle behavior information estimated by the vehicle behavior estimator 52.

(Control at Front Wheel)

The road surface distance L1, which the suspension controller 5 uses when controlling operation of the active suspension D, is desirably the road surface distance from the vehicle body member 30 to a measurement point P on the front side of a front wheel belonging to the vehicle V. It is desirable for the spring constant calculator 40 to calculate a spring constant of the active suspension D corresponding to the front wheel.

(Flow of Processing)

A flow of processing for a time of estimating a spring constant of a front tire is described with reference to FIG. 4. FIG. 4 is a flow chart that illustrates a process for a time of estimating the spring constant of a tire.

(S1)

In step 1 (S1), a procedure for updating the spring constant of the tire starts.

(S2)

In step 2 (S2), it is determined whether the vehicle V is in the vehicle stopped state. In a case where the vehicle V is in the vehicle stopped state, the determination in step 2 (S2) becomes Yes. The step proceeds to step 3 (S3).

In contrast, in a case where it is not determined that the vehicle V is in the vehicle stopped state, the determination in step 2 (S2) becomes No. The step proceeds to step 11 (S11).

(S11)

In step 11 (S11), it is determined that there is no update for the spring constant of the tire. This is because, in the vehicular state estimation apparatus according to the present embodiment, the spring constant is calculated in the vehicle stopped state. When it is determined in step 11 (S11) that there is no update to the spring constant of the tire, the flow proceeds to step 13 (S13). In step 13 (S13), the procedure for updating the tire spring constant ends.

(S3)

In a case where the determination in step 2 (S2) is Yes, the step proceeds to step 3 (S3). In step 3 (S3), in the vehicle stopped state, a stroke length for the suspension and a detection value from the distance sensor 11 are obtained. Note that, in the example illustrated in FIG. 4, a laser sensor is used as the distance sensor 11. Accordingly, a value obtained is a laser sensor value.

(S4)

The step proceeds from step 3 (S3) to step 4 (S4). In step 4 (S4), it is determined whether the state of the suspension has changed, and subsequently whether the vehicle stopped state is transitioned to. The state of the suspension changing means that the state of the suspension changing due to, inter alia, a person getting on or off, for example.

In a case where the state of the suspension has changed and subsequently the vehicle stopped state is transitioned to, the determination in step 4 (S4) becomes Yes. The step proceeds to step 5 (S5).

In contrast, in a case where it is not determined that the state of the suspension has changed and subsequently the vehicle stopped state is transitioned to, the determination in step 4 (S4) becomes No. The step proceeds to step 11 (S11). When it is determined in step 11 (S11) that there is no update to the spring constant of the tire, the flow proceeds to step 13 (S13). In step 13 (S13), the procedure for updating the tire spring constant ends.

As is understood from step 2 (S2) and step 4 (S4), estimation of a spring constant is not performed when the vehicle is not in a stopped state. In this case, operation of the active suspension apparatus is controlled by employing, as the spring constant, a fixed value or a value used at a time of previous control.

(S5)

In a case where the determination in step 4 (S4) is Yes, the step proceeds to step 5 (S5). In step 5 (S5), similarly to step 3 (S3), it is possible to obtain the stroke length for the suspension and the laser sensor value in the vehicle stopped state.

(S6)

The step proceeds from step 5 (S5) to step 6 (S6). In step 6 (S6), the obtained value in the state before the suspension changes is compared with the obtained value in the state after the suspension changed to thereby estimate the amount of change in the vehicle weight. The obtained value in the state before the suspension changes means the value obtained in step 3 (S3). In addition, the obtained value in the state after the suspension changes means the value obtained in step 5 (S5).

A calculation in step 6 (S6) is indicated by equations F1. In the equations F1, $x_s$ indicates the stroke length of the suspension, $K_s$ indicates the spring constant of the suspension, and m indicates the vehicle weight.

(Single-Wheel Model)

Figures 6A, 6B:
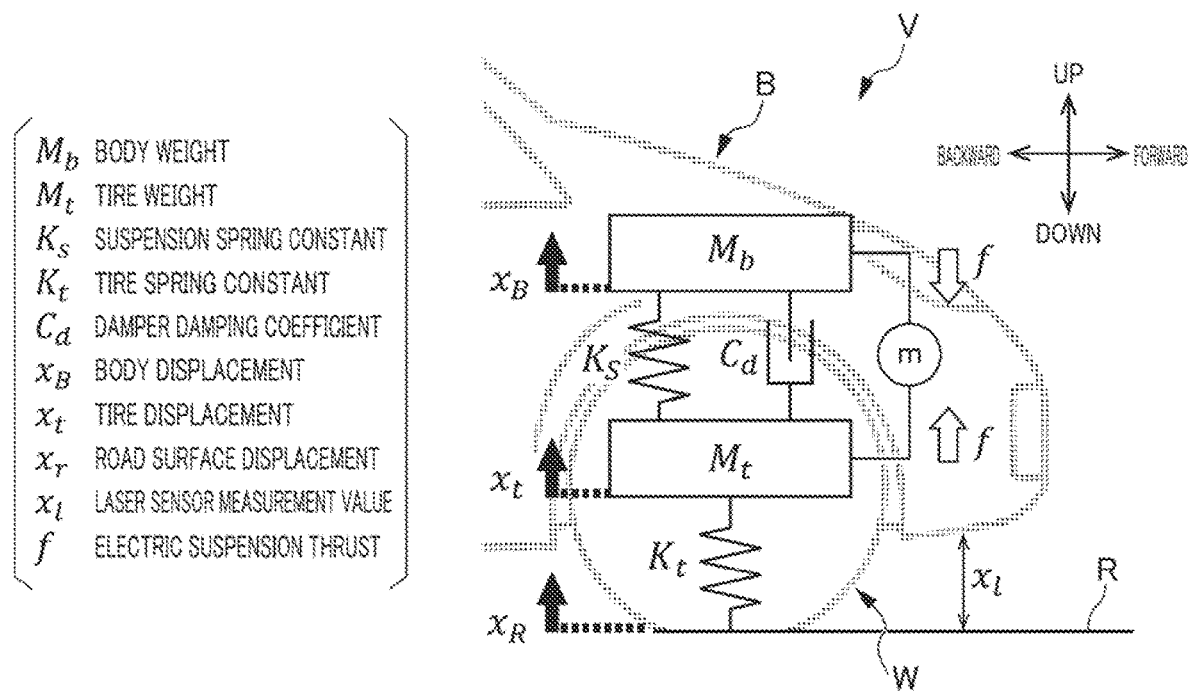
FIG. 6A is a view that illustrates a formula for calculating a correction for preview control.
FIG. 6B is a view that illustrates an electric suspension model used to estimate a spring constant.

Description is given regarding a single-wheel model for an electric suspension that is used to estimate a spring constant. FIG. 6B is a view that illustrates a single-wheel model for an electric suspension. As illustrated in FIG. 6B, in the single-wheel model, for one wheel W, the suspension is indicated by a model in which a spring component and a damper component are connected in parallel and the tire is indicated by a model having only a spring component. Respective equations referred to in the description of the embodiment correspond to the single-wheel model illustrated in FIG. 6B.

(S7)

The step proceeds from step 6 (S6) to step 7 (S7). In step 7 (S7), an amount of displacement by the tire is calculated from the amounts of change in the stroke length of the suspension and the laser sensor value.

The calculation in step 7 (S7) is indicated by an equation F2. In equation F2, $x_1$ indicates the laser sensor value, $x_s$ indicates the stroke length of the suspension, and $x_t$ indicates the amount of displacement by the tire.

(S8)

The step proceeds from step 7 (S7) to step 8 (S8). In step 8 (S8), a spring constant of the tire is estimated from the amount of displacement by the tire and the amount of change in the vehicle weight. For the amount of displacement by the tire, the value obtained in step 7 (S7) is used. In addition, for the amount of change in the vehicle weight, the value obtained in step 6 (S6) is used.

A calculation in step 8 (S8) is indicated by an equation F3. In the equation F3, m indicates the vehicle weight, $x_t$ indicates the amount of displacement by the tire, and $K_t$ indicates a spring constant of the tire.

(S9)

The step proceeds from step 8 (S8) to step 9 (S9). In step 9 (S9), a value for the tire spring constant estimated in step 8 (S8) is compared with a value for a spring constant estimated from a detection value from the tire pressure detector (TPM). It is determined whether there is no great difference between the two values.

In a case where there is no great difference between these two values, the determination in step 9 (S9) becomes Yes. The step proceeds to step 10 (S10).

Meanwhile, in a case where it is not determined that there is no great difference between these two values, the determination in step 9 (S9) becomes No. The step proceeds to step 12 (S12).

(S12)

In step 12 (S12), as the tire spring constant, the previous value is used. In other words, an update of the spring constant based on an estimation of the spring constant of the tire is not performed. Note that, in step 12 (S12), using the previous value for the tire spring constant is exemplified. In step 12 (S12), as the tire spring constant, it is possible to use a fixed value instead of the previous value.

In this manner, regarding the calculated tire spring constant, the tire spring constant value estimated based on the tire pressure detected by the tire pressure detector is compared with the calculated tire spring constant value. In a case where the difference therebetween is smaller than or equal to a certain level, operation of the active suspension apparatus is controlled by employing, as the spring constant, a value used at a time of previous control or a fixed value.

When it is determined in step 12 (S12) to use the previous value as the tire spring constant, the flow proceeds to step 13 (S13). In step 13 (S13), the procedure for updating the tire spring constant ends.

(S10)

In a case where the determination in step 9 (S9) is Yes, the step proceeds to step 10 (S10). In step 10 (S10), the estimated value of the tire spring constant is updated. Subsequently, the step proceeds to step 13 (S13), and the procedure for updating the spring constant of the tire ends.

(Suspension Spring Constant)

Next, with reference to FIG. 5, description is given regarding a procedure for updating the spring constant of the suspension. FIG. 5 is a flow chart that illustrates a process for a time of estimating the spring constant of the suspension. The spring constant of the suspension is earlier indicated by $K_s$ in the single-wheel model illustrated in FIG. 6B.

(S21)

In step 21 (S21), a procedure for updating the spring constant of the suspension starts.

(S22)

In step 22 (S22), it is determined whether the vehicle V is in the vehicle stopped state. In a case where the vehicle V is in the vehicle stopped state, the determination in step 22 (S22) becomes Yes. The step proceeds to step 23 (S23).

In contrast, in a case where it is not determined that the vehicle V is in the vehicle stopped state, the determination in step 22 (S22) becomes No. The step proceeds to step 27 (S27).

(S28)

In step 27 (S27), it is determined that there is no update for the spring constant of the suspension. This is because, in the vehicular state estimation apparatus according to the present embodiment, the spring constant is calculated in the vehicle stopped state. When it is determined in step 27 (S27) that there is no update to the spring constant of the suspension, the flow proceeds to step 28 (S28). In step 28 (S28), the procedure for updating the spring constant of the suspension ends.
(S23)

In a case where the determination in step 22 (S22) is Yes, the step proceeds to step 23 (S23). In step 23 (S23), a stroke length for the suspension is obtained in the vehicle stopped state.
(S24)

The step proceeds from step 23 (S23) to step 24 (S24). In step 24 (S24), the active suspension is caused to generate thrust. An amount of change by the stroke length for the suspension in this case is obtained.
(S25)

The step proceeds from step 24 (S24) to step 25 (S25). In step 25 (S25), the spring constant of the suspension is estimated from the amount of change in the stroke length of the suspension and thrust outputted by the active suspension.

A calculation in step 25 (S25) is indicated by an equation F4. In the equation F4, $K_s$ indicates the spring constant of the suspension, $x_s$ indicates the stroke length of the suspension, and F indicates a thrust F outputted by the active suspension.
(S26)

The step proceeds from step 25 (S25) to step 26 (S26). In step 26 (S26), the estimated value of the suspension spring constant is updated. The step next proceeds to step 28 (S28), and the procedure for updating the spring constant of the suspension ends.

(Example of Suspension Control)

Description is given regarding an example of suspension control that uses a spring constant. The suspension controller 5 in the present embodiment can use the spring constant in at least one calculation from among a correction for preview control, an adjustment of a constant in skyhook control, or an adjustment of a constant in damping control.

(Preview Control)

Preview control is controlling operation of the active suspension D in response to future behavior by the vehicle V and based on an amount of change in the road surface distance L1. FIG. 6A illustrates an equation for defining a correction in preview control. In the equation illustrated in FIG. 6A, $F_R$ indicates thrust for the active suspension, $C_s$ indicates a damping coefficient for the suspension, $K_s$, indicates a spring constant of the suspension, $C_t$ indicates a damping coefficient for the tire, $K_t$ indicates a spring constant of the tire, $M_t$ indicates the weight of the tire, $x_r$ indicates road surface displacement, and $x_{rR}$ indicates road surface displacement.

In preview control, it is possible to substitute a calculated spring constant into the formula illustrated in FIG. 6A for calculating a correction for preview control. In other words, in the equation illustrated in FIG. 6A, it is possible to exchange a corresponding spring constant with a calculated value for a spring constant.

(Skyhook Control)

A calculated spring constant can also be used to adjust a constant in skyhook control. Skyhook control is control for reproducing, in electric suspension, behavior as if a damping damper is attached to only the vehicle body B. Specifically, feedback control in skyhook control is performed in accordance with a value resulting from multiplying a skyhook gain which is a damping coefficient by the first-order integral of the acceleration of the vehicle body B, in other words the speed of the vehicle body B. When obtaining this value, it is possible to use the calculated spring constant.

(Damping Control)

A calculated spring constant can also be used to adjust a constant in damping control. Damping control is control for assisting extension and contraction by the suspension. Damping control is performed in accordance with a value resulting from multiplying a suspension stroke speed by a damper constant c. Here, the stroke speed can be obtained in the following manner. That is, the stroke speed is obtained by a motor rotation sensor in the electric suspension. It is possible to use, inter alia, a resolver or an encoder as the motor rotation sensor. Alternatively, it is possible to obtain the stroke speed in accordance with a first-order of a stroke displacement sensor.

In damping control, it is possible to employ a spring constant calculated in the present embodiment as a tire spring constant, and set the damper constant c in damping control to be smaller the larger the tire spring constant is.

(Method of Controlling Operation of Active Suspension Apparatus)

It is possible to use the suspension system 3 according to the present embodiment to execute a method of controlling operation of the active suspension D such as the following. In other words, it is possible to realize a method of controlling operation of the active suspension D in the vehicle V which is provided with the active suspension D and the suspension controller 5, the method including: a physical quantity detection step for detecting a physical quantity indicating behavior by the vehicle V; a vehicle behavior estimation step for, based on the physical quantity detected in the physical quantity detection step, estimating current behavior by the vehicle V; a distance detection step for detecting a value pertaining to a distance between the vehicle body member 30 included in the vehicle V and the measurement point P on a road surface in front of the vehicle V and corresponding to at least the central section 43 of the road surface contact section 41 on a wheel W; a distance calculation step for, based on a detection value detected in the distance detection step, calculating the road surface distance L1 that is a distance from the vehicle body member 30 to the measurement point P; a spring constant calculation step for calculating at least one of spring constants of the active suspension D, in a stopped state for the vehicle V; and a suspension control step for controlling operation of the active suspension D based on the spring constants, the road surface distance L1, and vehicle behavior information that is information indicating the current behavior by the vehicle V estimated in the vehicle behavior estimation step.

Description is given above regarding an embodiment of the present invention, but the present invention is not limited to the embodiment described above, and various modifications, transformations, and combinations are possible.

EXPLANATION OF REFERENCE NUMERALS

1 Preview road surface detection apparatus
3 Suspension system (vehicular state estimation apparatus)
4 Preview controller
5 Suspension controller (suspension control apparatus)
11 Distance sensor
12 Distance calculator
20 Exterior member
30 Vehicle body member
40 Spring constant calculator
41 Road surface contact section
43 Central section
51 Physical quantity detector (tire pressure detector)
52 Vehicle behavior estimator B Vehicle body
D Active suspension (active suspension apparatus)
D1 Suspension spring
D2 Variable damper
L1 Road surface distance
L2 Road surface displacement
L3 Vehicle height
L4 Road surface contact width
P Measurement point
R Road surface
V Vehicle
W Wheel
W1 Spring
W2 Damper

What is claimed is:

1. A vehicular state estimation apparatus for use in a vehicle provided with an active suspension apparatus and a suspension control apparatus, the vehicular state estimation apparatus comprising:
    a physical quantity detector configured to detect a physical quantity indicating behavior by the vehicle;
    a vehicle behavior estimator configured to, based on the physical quantity detected by the physical quantity detector, estimate current behavior by the vehicle;
    a distance sensor that is provided on a vehicle body member included in the vehicle and is configured to detect a value pertaining to a distance between the vehicle body member and a measurement point on a road surface in front of the vehicle and corresponding to at least a central section of a road surface contact section on a wheel;
    a distance calculator configured to, based on the value detected by the distance sensor, calculate a road surface distance that is a distance from the vehicle body member to the measurement point;
    a spring constant calculator configured to calculate at least one of spring constants of the active suspension apparatus, in a vehicle stopped state; and
    a suspension controller configured to control operation of the active suspension apparatus based on the spring constants, the road surface distance, and vehicle behavior information that is information indicating the current behavior by the vehicle estimated by the vehicle behavior estimator.

2. The vehicular state estimation apparatus according to claim 1, wherein
    the distance calculator calculates, as the road surface distance, a distance from the vehicle body member to the measurement point in front of a front wheel belonging to the vehicle, and
    the spring constant calculator calculates the spring constant of the active suspension apparatus corresponding to the front wheel.

3. The vehicular state estimation apparatus according to claim 1, wherein
    when the vehicle is not in the vehicle stopped state, the suspension controller controls operation of the active suspension apparatus by employing, as the spring constant, a fixed value or a value used at a time of previous control.

4. The vehicular state estimation apparatus according to claim 1, wherein the suspension controller uses the spring constant in at least one calculation from among a correction for preview control, adjusting a constant in skyhook control, or adjusting a constant in damping control.

5. The vehicular state estimation apparatus according to claim 4, wherein the suspension controller exchanges the calculated spring constant of a member with a spring constant of a corresponding member in an equation for calculating the correction for preview control.

6. The vehicular state estimation apparatus according to claim 4, wherein
    the calculated spring constant of the member is a tire spring constant, and
    the suspension controller adjusts a damper constant in an equation for damping control adjustment such that the greater the tire spring constant, the smaller the damper constant in a stroke speed×the damper constant.

7. The vehicular state estimation apparatus according to claim 1, further comprising:
    a tire pressure detector,
    wherein the calculated spring constant of a member is a tire spring constant, and
    a tire spring constant prediction value estimated based on a tire pressure detected by the tire pressure detector is compared with the calculated tire spring constant, and in a case where a difference between the tire spring constant prediction value and the calculated tire spring constant is greater than or equal to a certain level, the operation of the active suspension apparatus is controlled by employing, as the spring constant, a fixed value or a value used at a time of previous control.

8. A method of controlling operation of an active suspension apparatus in a vehicle provided with the active suspension apparatus and a suspension control apparatus, the method comprising:
    detecting a physical quantity indicating behavior by the vehicle;
    estimating current behavior by the vehicle based on the physical quantity detected in the detecting a physical quantity;
    detecting a value pertaining to a distance between a vehicle body member included in the vehicle and a measurement point on a road surface in front of the vehicle and corresponding to at least a central section belonging to a road surface contact section on a wheel;
    calculating a road surface distance that is a distance from the vehicle body member to the measurement point based on the value detected in the detecting a value pertaining to a distance;
    calculating at least one of spring constants of the active suspension apparatus, in a vehicle stopped state; and
    controlling operation of the active suspension apparatus based on the spring constants, the road surface distance, and vehicle behavior information that is information indicating the current behavior by the vehicle estimated in the detecting a physical quantity indicating behavior by the vehicle.

* * * * *